United States Patent

[11] 3,593,685

[72] Inventor Walter C. Cowles
 Stamford, Conn.
[21] Appl. No. 802,341
[22] Filed Feb. 26, 1969
[45] Patented July 20, 1971
[73] Assignee Esso Research and Engineering Company

[54] BOUNDARY LAYER CONTROL AND PROPULSION AUGMENTING SYSTEM
 3 Claims, 4 Drawing Figs.
[52] U.S. Cl. .................................................. 114/67
[51] Int. Cl. .................................................. B63b 1/34
[50] Field of Search .......................................... 114/67;
 244/130

[56] References Cited
 UNITED STATES PATENTS
 2,969,759 1/1961 Giles .......................... 244/130 X
 3,289,623 12/1966 Gray et al. .................... 114/67
 1,119,178 12/1914 Krantz ........................ 114/67
 3,319,593 5/1967 Papst .......................... 114/67

Primary Examiner—Andrew H. Farrell
Attorneys—Manahan and Wright and Donald F. Wohlers ABSTRACT: Boundary layer separation in surface ships is controlled by drawing in sea water through a plurality of openings in the shell of the ship. These openings are provided in a pair of perforated panel that extend vertically from the flat of the ship's bottom, to near the waterline and are located on opposite sides of the ship near the stern where boundary layer separation would otherwise occur. The sea water sucked in from the boundary layer can be utilized to augment the propulsive thrust of the ship's propellers by forcing the water through the propellers and discharging it from the trailing edge of the propellers' blades. In addition, or alternatively, the sea water can be used to for cooling in the ship's propulsion system.

PATENTED JUL 20 1971    3,593,685

INVENTOR
WALTER C. COWLES

BY Donald F. Cowles
ATTORNEY

BOUNDARY LAYER CONTROL AND PROPULSION AUGMENTING SYSTEM

This invention relates to a system for improving the operating efficiency of surface ships. More particularly, the invention relates to a system for controlling boundary layer separation along the after part of the ship to reduce the ship's resistance to passage through water to increase the propulsive thrust of the ship, and to reduce propeller induced vibration by stabilizing the flow of water into the propeller.

It is known that the resistance of a body moving through a viscous fluid can be reduced by control of boundary layer flow, that is the flow of the layers of fluid nearest the body's surface. Although many attempts have been made to reduce the resistance of airfoils and underwater vehicles through control of the boundary layer, no commercially successful systems have heretofore been developed for use on large, full-bodied surface ships such as tankers and ore-carriers.

Previous systems for controlling boundary layer flow of high-speed watercraft have involved removing relatively small amounts of fluid adjacent to the skin of the vessel to prevent flow separation. Alternatively proposed systems for removing large volumes of water require the use of large capacity pumps and piping systems making the systems economically unattractive.

It is now been discovered that boundary layer control of full-bodied surface ships can be achieved by inducing a defined zone of suction flow of water from the boundary layer through a pair of substantially vertically extending panels located on opposite sides of the ship where boundary layer separation would otherwise occur. The energy required to create the suction flow is converted to a fluid pressure head to augment the operating efficiency of the ship, by using the water in the ship's propulsion unit to cool the ship's steam condenser or diesel engines and/or discharging it through the ship's propellers. Thus, the system of the present invention significantly increases the overall operating efficiency of the ship.

The invention includes a method for reducing the resistance of surface ships which comprises creating a defined zone of suction flow of water through the exterior surface of both sides of the ship adjacent the stern. The defined zone of suction flow extends substantially vertically from the flat of the ship's bottom to near the waterline, and is located at or near the point where boundary layer separation would otherwise occur. The water drawn in from the boundary layer at these zones delays separation of the boundary layer from the ship's surface and thereby reduces the ship's resistance to passage through water. Preferably, the water from the boundary layer is directed to the ship's propulsion unit where it can be used either in whole or in part to cool the propulsion unit and/or discharged through the ship's propellers to enhance propulsion efficiency.

The invention further includes an assembly for increasing the operating efficiency of surface ships including boundary layer control means, comprising (a) a pair of perforated panels on the outer surface of the ship, each of which extends substantially vertically from the flat of the ship's bottom to near the waterline and is located on one of the opposite sides of the ship near the stern where boundary layer separation would otherwise occur; (b) duct means for collecting water passing through the perforated panels; and (c) a pump having its inlet end connected to the duct means for inducing and maintaining a suction flow of water through the perforated panels, whereby separation of the boundary layer is delayed to reduce the ship's resistance to passage through water.

Preferably, the assembly includes propulsion augmenting means in combination with the boundary layer control means. The propulsion augmenting means comprises a hollow propeller shaft and a propeller having internal water-conducting passages and discharge openings on the trailing edge of its blades. The inlet end of each passage is connected to the hollow shaft and the outlet end of each passage is connected to the discharge openings in the blades. Coupling means are further provided to connect the discharge from the pump with the shaft so that water from the boundary layer is forced through the shaft and the propeller and out the discharge openings in the propeller to increase the propulsive thrust of the propeller.

Additionally or alternatively, the assembly includes means for coupling the discharge from the pump with the cooling system for the ship's propulsion unit so that the water from the boundary layer can be used at least in part to cool the unit and thereby further increase the operating efficiency of the ship.

It is to be understood that both the foregoing general description and the following detailed description are exemplary and explanatory but are not restrictive of the invention.

Reference will now be made in detail to the preferred embodiments of this invention, examples of which are illustrated in the accompanying drawings.

Figure 1:
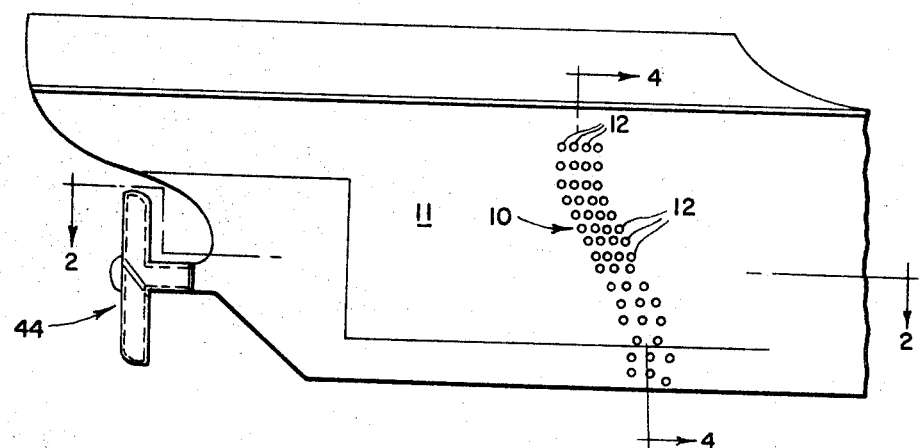
FIG. 1 is a schematic elevation of the aft portion of a ship constructed in accordance with this invention.

The present system for increasing the operating efficiency of surface ships is applicable to a variety of hull designs, but is especially suited to increasing the efficiency of full-bodied ships such as tankers and ore carriers. The system of the invention achieves significant reductions in the ship's resistance to passage through water and increases the propulsive efficiency of the ship.

As shown in the drawings, the boundary layer control means of this invention includes a pair of perforated panels 10 on each side of the outer surface of the ship's hull, generally indicated as 11. Each panel 10 extends vertically from the flat of the bottom to near the waterline of the ship when it is fully loaded, and is located adjacent the stern at or near the point where boundary layer separation would occur in the absence of the boundary layer control means of this invention.

Each panel 10 includes a plurality of small openings 12 that permit flow of water through the panels. As here embodied and as illustrated in FIG. 1, openings 12 are all the same size and the openings are spaced closer together at the upper portion of the panel than at the lower portion of the panel. This spacing compensates for the variation in water pressure head along the vertical height of the panel and permits removal of approximately equal volumes of water through both the top and bottom portions of the perforated panel when the panel is fully submerged.

It is possible to vary the size of openings 12 between the upper and lower portions of the panels, rather than varying the spacing of the openings. However, to avoid the problem of plugging that could be associated with small openings on the lower portion of a ship's hull, it is preferable to vary the spacing rather than the size of openings 12.

In accordance with the invention, duct means are provided for collecting the water that passes through the openings in the perforated panels. The discharge end of the duct means is connected to the inlet end of a pump so that a zone of reduced pressure is created within the duct means to suck water from the boundary layer through the openings in the perforated panels.

Figure 4:
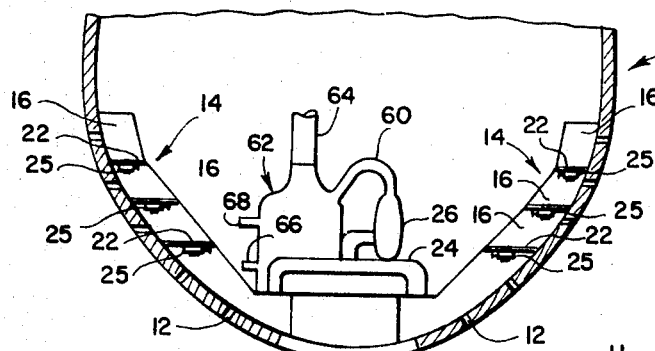
FIG. 4 is a transverse sectional view taken along line 4–4 of FIG. 1 and illustrating an alternative embodiment of the invention in which water sucked through the outer wall of the vessel is discharged to the ship's steam condenser.
Figure 2:
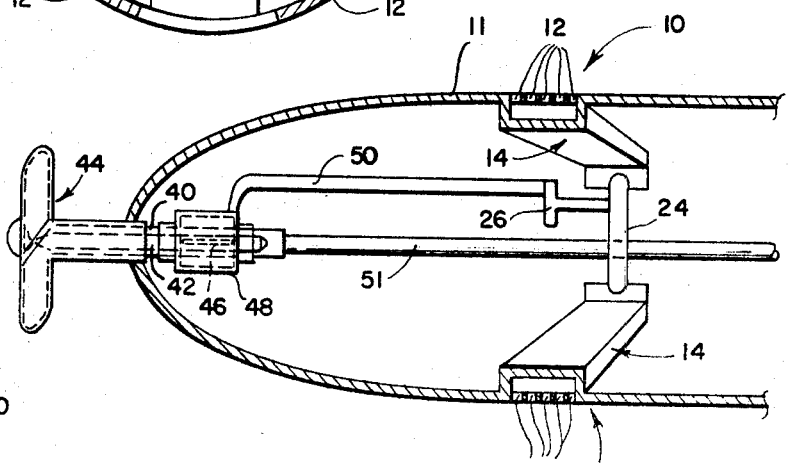
FIG. 2 is a sectional view taken along the line 2–2 of FIG. 1 and illustrating a preferred embodiment of the invention in which the water sucked through the outer walls of the vessel is discharged through the ship's propeller.

As embodied and as best shown in FIGS. 2 and 4, the duct means comprises vertically extending ducts, generally 14, located behind each panel 10. The ducts include a series of compartments 16 separated by horizontal partitions 22.

Each partition 22 has a valve 25 to regulate the flow of water through each compartment. Thus, the intake of water through each panel 10 can be adjusted for variations in draft resulting from different conditions of load and ballast.

A pipe 24 connects the bottom of each duct 14 with the inlet end of a pump 26 for inducing a suction flow of water through perforated panels 10 and into ducts 14.

Hence, with the system of this invention, water is sucked in from the boundary layer in a defined zone provided by a plurality of openings in a pair of substantially vertically extending perforated panels, located at or near the point where boundary layer separation would otherwise occur, to prevent or delay separation of the boundary layer.

By preventing or delaying the separation of the boundary layer from the surface of the ship, the length of the region of upstream flow between the surface of the ship and the separated boundary layer is reduced, thus reducing the resistance of the ship to passage through the water.

In accordance with a preferred embodiment of this invention, water from pump 26, that has been sucked in through the openings in panels 10, is discharged to the ship's propulsion unit to increase the operating efficiency of the ship.

In one embodiment propulsion augmenting means are provided in combination with the boundary layer control means to increase the propulsive thrust of the ship's propeller.

As embodied, and as shown in FIG. 2, the propulsion augmenting means includes a hollow propeller shaft 40 having a longitudinally extending bore 42 and a propeller 44 connected to the end of shaft 40. Bore 42 in shaft 40 includes a lateral slot 46 and around slot 46 there is located a manifold 48. Manifold 48 is connected to pump 26 through line 50 and feeds water under pressure from the pump through slotted portion 46 and into bore 42 of hollow propeller shaft 40. Shaft 40 is connected through drive shaft 51 with the ship's propulsion unit (not shown).

Figure 3:
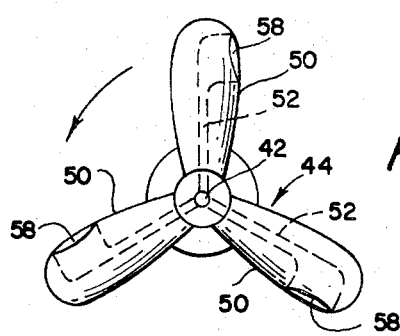
FIG. 3 is an end elevation view of the propeller shown in FIGS. 1 and 2.

As best seen in FIG. 3, each blade 50 of propeller 44 includes a water-conducting passage 52 that is connected at its inlet end to shaft bore 42 and at its outlet end to a discharge opening 58 on the trailing edge of the blade. Discharge openings 58, therefore, emit high-velocity streams of water in such a manner as to increase the lift of each propeller blade thereby increasing the propeller's thrust.

Preferably, and as shown in FIG. 3, each discharge opening 58 comprises a radially extending slot, shaped to direct the high-velocity stream of water into the relatively static body of water behind the propeller blade and thereby produce maximum thrust. The radial slot configuration of the discharge openings provides a smooth contoured outlet for the water to minimize frictional losses in the high-velocity water stream. Alternatively, a plurality of openings provided along the trailing edge of each blade can be substituted for the slot configuration illustrated in the drawings.

In another embodiment of the invention means are provided for connecting the discharge from the pump with the cooling system for the ship's propulsion unit so that water from the boundary layer can be used to cool the unit and thereby further increase the operating efficiency of the ship. Thus, the water can be used as a coolant for the ship's steam condensers, diesel engines, or types of propulsion units. For purposes of illustration, however, the propulsion unit cooling system will be described as it relates to steam condensers.

As embodied and as shown in FIG. 4, the connecting means includes a discharge line 60 from pump 26 connected to the interior tubes of a marine surface condenser, generally 62. The exhaust steam from the ship's propulsion unit (not shown) enters condenser 62 through line 64 and condensate flows out of condenser 62 through discharge line 66. The sea water supplied to the condenser by pump 26 exits from the condenser through discharge line 68 and can be directly discharged rearwardly of the ship, or, alternatively, can be discharged through the hollow propeller shaft and propeller as illustrated in FIG. 2.

Thus, by alternatively or additionally utilizing the water sucked in through panels 10 as a source of coolant for the ship's propulsion unit, the need for additional operating equipment and power to supply coolant to the unit is eliminated, thereby further increasing the overall operating efficiency of the ship.

The invention in its broader aspects is not limited to the specific details shown and described and departures may be made from such details without departing from the principles of the invention and without sacrificing its chief advantages.

I claim:

1. An assembly for increasing the operating efficiency of surface ships including boundary layer control means, said means comprising: (a) a pair of perforated panels on the outer surface of the ship, said panels extending substantially vertically from the flat of the ship's bottom to near the water line and being located on opposite sides of the ship near the stern where boundary layer separation would otherwise occur; (b) duct means for collecting water passing through said perforated panels; (c) a pump having its inlet end connected to the duct means for inducing and maintaining a suction flow of water through the perforated panels; (d) and means for connecting the discharge from the pump with the cooling system for the ship's propulsion unit, whereby water from the boundary layer is used to cool the unit and thereby further increase the operating efficiency of the ship, and separation of the boundary layer is delayed and the ship's resistance to passage through water is reduced.

2. An assembly for increasing the operating efficiency of surface ships provided with a circulating or cooling water pump, including boundary layer control means, said means comprising: (a) a pair of perforated panels on the outer surface of the ship, said panels extending substantially vertically from the flat of the ship's bottom to near the waterline and being located on opposite sides of the ship near the stern where boundary layer separation would otherwise occur so as to effect a measure of boundary layer control, the perforations in each of said panels being spaced closer together near the top of said panel than at the bottom to compensate for variations of the water pressure head along said panel and to permit removal of approximately equal volumes of water along the vertical length of said panels; (b) duct means for collecting water passing through said perforated panels; and (c) said pump having its inlet end connected to the duct means for inducing and maintaining a suction flow of water through the perforated panels, whereby separation of the boundary layer is delayed and the ship's resistance to passage through water is reduced.

3. An assembly for increasing the operating efficiency of surface ships provided with a circulating or cooling water pump, including boundary layer control means, said means comprising: (a) a pair of perforated panels on the outer surface of the ship, said panels extending substantially vertically from the flat of the ship's bottom to near the water line and being located on opposite sides of the ship near the stern where boundary layer separation would otherwise occur so as to effect a measure of boundary layer control, the perforations in each of said panels in the upper and lower portions thereof differing in size to compensate for variations of the water pressure head along the panel and to permit removal of approximately equal volumes of water along the vertical length of said panels; (b) duct means for collecting water passing through said perforated panels; and (c) said pump having its inlet end connected to the duct means for inducing and maintaining a suction flow of water through the perforated panels, whereby separation of boundary layer is delayed and the ship's resistance to passage of water is reduced.